Figure 1:
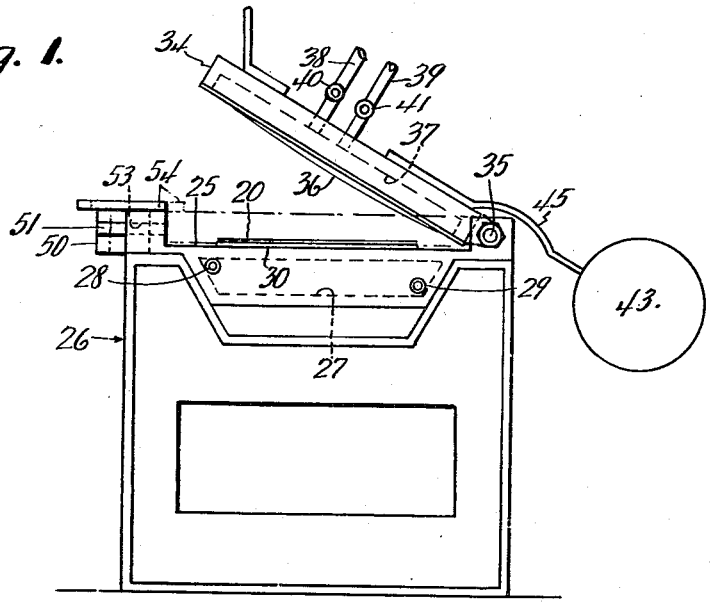

July 28, 1942.  W. H. CRAIG ET AL  2,291,451

METHOD OF CUTTING GLASS

Filed March 27, 1940  4 Sheets-Sheet 1

INVENTORS
WALKER H. CRAIG and
GEORGE T. FINLEY JR
BY
ATTORNEY

July 28, 1942.   W. H. CRAIG ET AL   2,291,451
METHOD OF CUTTING GLASS
Filed March 27, 1940   4 Sheets-Sheet 2
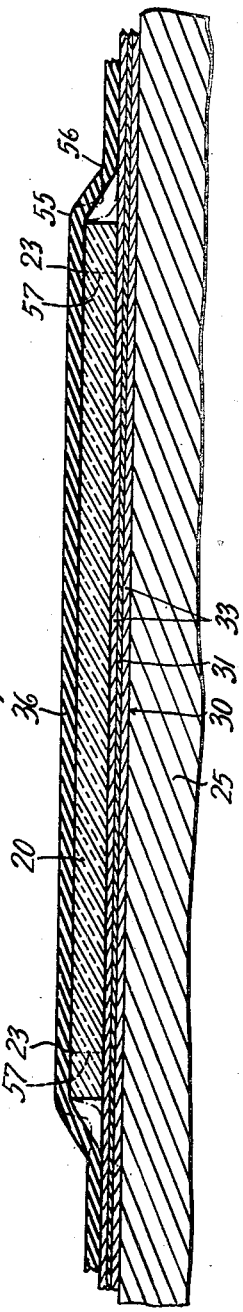
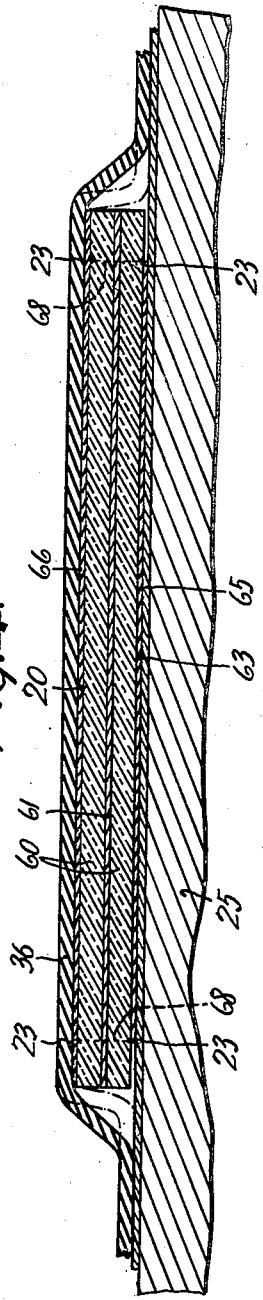
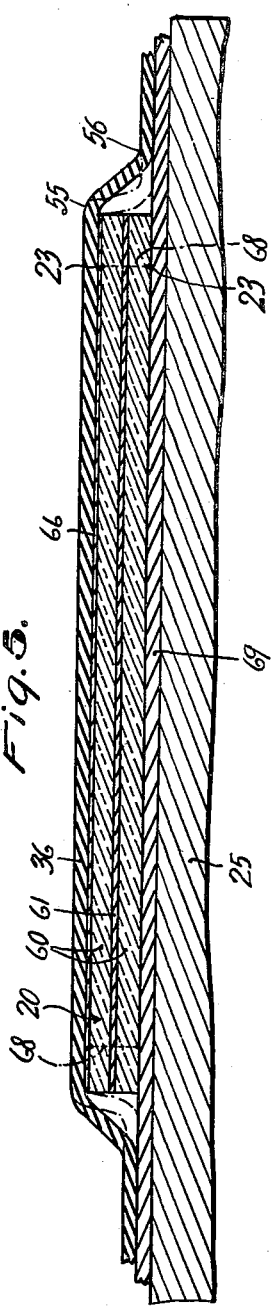
INVENTORS
WALKER H. CRAIG and
GEORGE I. FINLEY JR.
BY
Olew E. Bee
ATTORNEY

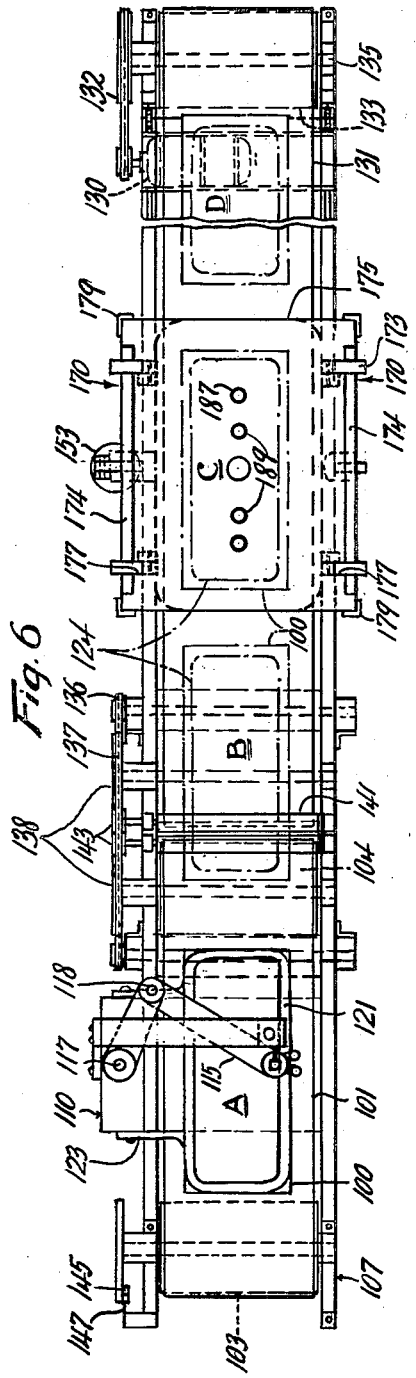
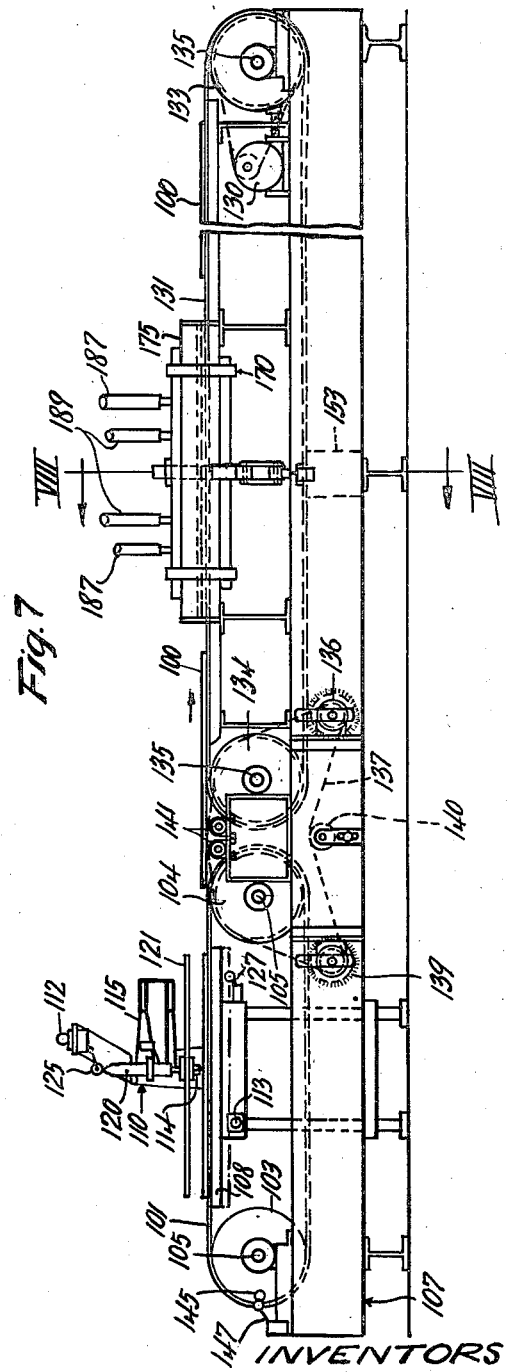

July 28, 1942.　　W. H. CRAIG ET AL　　2,291,451
METHOD OF CUTTING GLASS
Filed March 27, 1940　　4 Sheets-Sheet 4

INVENTORS
WALKER H. CRAIG and
GEORGE I. FINLEY JR.

BY Olew E. Bee
ATTORNEY.

Patented July 28, 1942

2,291,451

UNITED STATES PATENT OFFICE 2,291,451

METHOD OF CUTTING GLASS

Walker H. Craig and George I. Finley, Jr., Crystal City, Mo., assignors to Pittsburgh Plate Glass Company, a corporation of Pennsylvania Application March 27, 1940, Serial No. 326,206

9 Claims. (Cl. 49—77)

This invention relates to methods of and apparatus for trimming or cutting sheet glass and it has particular relation to improvements in the art of trimming or snapping off marginal portions of the glass.

One object of the invention is to provide an improved method of snapping sheet glass along a predetermined line.

Another object of the invention is to provide an improved method in which fluid pressure is employed in removing marginal portions from sheet glass.

Another object of the invention is to provide an improved method of cutting or trimming laminated sheet glass.

Another object of the invention is to provide an improved apparatus for cutting or snapping off marginal portions of sheet glass.

Another object of the invention is to provide an improved apparatus for automatically handling sheet glass in subjecting it to removal of marginal portions thereof.

In trimming the marginal portions of sheet glass from units which are to be employed for special purposes, such as for windows in automobiles, considerable difficulty has been experienced in providing a uniform breaking or snapping which will produce a new edge entirely free from chipped or ragged corners, and which provides square edges, that is, edges which are in truly perpendicular relation to opposite faces of the glass. In previously known glass cutting methods, considerable marginal waste, or so-called shrinkage, was involved because it has been found that the placing of the cut or score near the glass edge resulted in excessive breakage and uneven severing. The operation of snapping the sheet glass along its scored portions is referred to as "running cuts."

According to this invention, uniform fluid pressure is applied to the cut or scored sheet glass in such manner as to remove the edge portions and leave square edges as well as edges free from flares and chipping. Loss from shrinkage or marginal waste can thus be reduced by at least 25 per cent. In one application of the invention a flexible or resilient diaphragm is placed over the scored sheet glass, the latter of which rests upon a suitably cushioned support, and then, fluid under pressure is applied upon the diaphragm to press the glass against its support. The diaphragm can be in the form of one wall of a suitable fluid pressure chamber. The pressure applied in this manner snaps off the marginal portions of the glass outside the scored area and insures even and square severing. Since the application of fluid pressure is even and progressive, the scoring can be located immediately adjacent the glass edge.

In trimming laminated glass units, similar procedure can be followed, although the sheet glass unit is scored coextensively on opposite sides. The diaphragm is first applied under pressure on one side of the glass unit; then the latter is reversed and pressure applied in like manner upon the opposite side. The first application of the diaphragm can be effected on a hot press under heat approximating 240 to 260 degrees F. and the second or final application of the diaphragm is effected in a cold press at approximately room temperature.

The operations approximating those described above can be effected automatically by providing a conveyor system which carries the glass from a cutting apparatus to a press and suitable mechanism is devised for automatically accomplishing the successive operations of progressively moving the glass to and from the press and applying pressure at the time it registers with the press. Then the glass is transported by the conveyor system away from the press.

Figure 2:
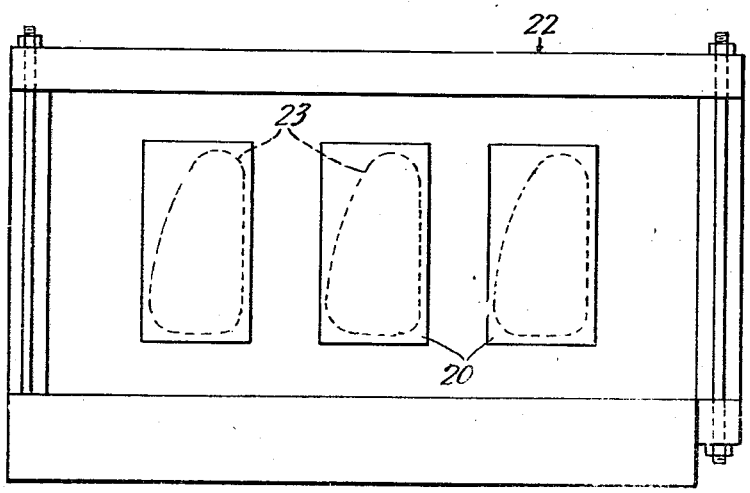
Figure 8:
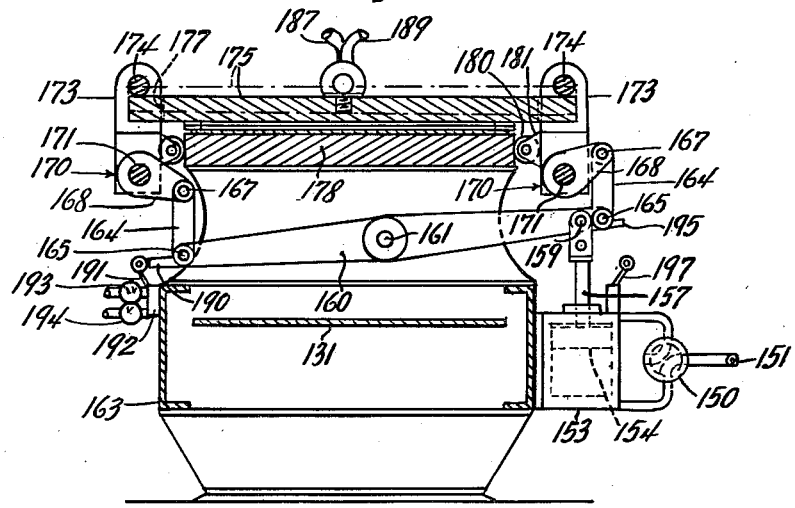
Figure 9:
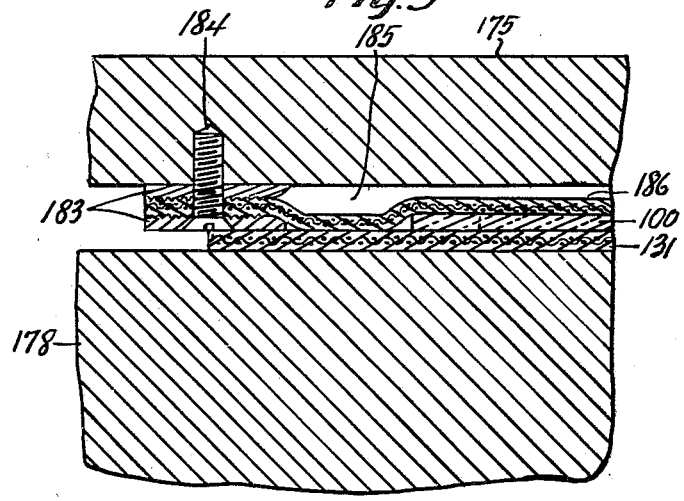

In the drawings:

Fig. 1 is a diagrammatic side elevation of a press employed in snapping the marginal portions of glass units; Fig. 2 is a plan of a glass cutting table having scored glass sheets thereon; Fig. 3 is a fragmentary cross section, on a larger scale, illustrating the application of a diaphragm in trimming marginal portions of the glass; Fig. 4 is a cross section similar to Fig. 3 in which laminated glass is handled; Fig. 5 is a cross section illustrating a succeeding step of the operations which follow that shown in Fig. 4; Fig. 6 is a plan of an automatic machine for scoring and trimming sheet glass; Fig. 7 is a side elevation of the machine shown in Fig. 6; Fig. 8 is a cross section taken substantially along the line VIII—VIII of Fig. 7; and Fig. 9 is a fragmentary cross section showing in detail a fluid pressure chamber of a press.

Referring to Figs. 1 to 5, sheet glass units 20 are placed upon a suitable support 22 and scored or cut by means of a conventional glass cutter (not shown) along lines 23 adjacent the edges or border of the glass. Primarily, the glass to be cut or trimmed is that which is to have a relatively narrow strip removed around its marginal portions and the scoring is made along a substantially endless line. However, it is to be understood that one marginal portion of glass can be removed by the method described, while other unscored marginal portions remain intact.

In one form of the invention, the scored glass unit 20 is placed upon a horizontal bed plate 25 of a press 26 which can be provided with a heating chamber 27 at the lower side of the bed plate. Flexible inlet and outlet conduits 28 and 29 communicate with the chamber and with a source of heated fluid (not shown) by which the temperature of the bed plate is controlled. If desired, a cushion or other yieldable supporting unit 30 is placed horizontally upon the bed plate to carry the glass in a substantially horizontal plane. In one form of cushion (Fig. 3) a thin metal plate 31, such as aluminum, copper, or the like, is confined between two cushioning or yieldable sheets 32, such as felt pads.

A press head 34, having a hinge connection 35 with the body of the press, has its lower side constructed in the form of a diaphragm 36 which constitutes a lower wall of a pressure chamber 37 formed in the press head. Flexible inlet and outlet conduits 38 and 39 connected to a source of fluid under pressure (not shown) are provided for supplying the fluid to the pressure chamber 37 and exhausting it therefrom. Valves 40 and 41 control the flow of the fluid into and out of the chamber. In order to facilitate the operation of the head about its hinge connection, a counterbalancing weight 43 is mounted at the end of an arm 45 extending rigidly from the rear side of the head.

One form of suitable locking mechanism 50 for the press head is provided on the side of the press opposite the hinge connection 35, and it has locking members 51 slidable in horizontal guides 53 formed in the upper portion of the press. The upper side of the locking mechanism is provided with a flange or projection 54 which slides over the edge of the press head to hold the latter in closed position, as shown in broken lines of Fig. 1, and in this position fluid under pressure is admitted into the chamber to press the diaphragm against the glass.

The diaphragm 36, which is resilient and flexible, covers the sheet glass unit 20 and overlaps all of its edges. After the application of fluid under pressure in the chamber 37, the diaphragm assumes at the edges of the glass approximately the relationship shown in the broken lines of Fig. 3. Such pressure tensions the portion of the diaphragm indicated between the points 55 and 56 and hence force is applied entirely around the glass upon the upper corners thereof in an outward and downward direction, that is, in an inclined direction with reference to the surfaces of the glass. This force is sufficient to snap or sever the glass along the lines 57 and to produce a break at substantially right angles to the faces of the sheet glass. In view of the uniformity of pressure and close confinement of the glass during this operation, the severed edges are free from chipping or flaring. Although a cushion of two sheets of felt having a metal plate therebetween has been found to be satisfactory, other types of cushions are applicable. In this type of operation in which a single thickness of glass is trimmed, the bed plate need not be heated.

In the arrangement shown in Figs. 4 and 5, the glass unit 20 can be in the form of safety glass composed of two glass sheets 60 having an interlayer 61 of transparent resin, such as vinyl acetal, cemented therebetween. The scoring 23 in this case is performed coextensively on opposite sides of the unit adjacent its edges. A pattern 63 of thin metal plate, such as copper, and corresponding in shape to the shape of the pattern to which the glass is to be trimmed, is placed upon a cushion 65 of cardboard, or the like, that is supported upon the bed plate 25. The safety glass unit is fitted upon the metal pattern 63 (Fig. 4) in such manner that its edges register with the pattern of the scoring. The marginal portions of the glass unit which are disposed outwardly from the scoring thus overlap the edges of the metal pattern 63 and a covering of cardboard 66, or like material, is then laid over the top of the glass.

In trimming the safety glass, the press 26 is employed as a hot press and by introducing the heated fluid into the chamber 27, the bed plate is heated to a temperature of 240 to 260 degrees F. After so heating the bed plate, the operation of supplying fluid under pressure uniformly over the diaphragm 36 is effected in the same manner as that described above and the glass is at least partially severed or snapped along the line 68 perpendicularly to the plane surfaces of the glass unit.

Then the glass unit is removed from the press, turned over, or so reversed that the upper side which was first engaged by the diaphragm is disposed downwardly against a cushion of rubber 69, or like material, supported on the bed plate 25 of a second press which is not heated. The cardboard shield 66 is placed over the glass unit and the fluid pressure is applied uniformly over the diaphragm in the same manner as that previously described. Two presses of substantially identical structure are employed in these two pressure operations and the description of only one press is necessary. In the second or hot press operation, the metal pattern 63 is not required. In both of these operations, the glass unit is snapped along the line 68 by the action of the fluid forcing the marginal portions of the glass outwardly and downwardly in connection with the tensioning of the diaphragm along the edges of the glass.

In the arrangement shown in Figs. 6 to 9, successive operations are performed in cutting the glass, transporting it and snapping it at a predetermined station along a conveyor system. In effecting these operations, a sheet glass unit 100 is positioned horizontally upon the upper side of a felt-covered conveyor belt 101 which is carried upon drums 103 and 104 rotatable in bearing supports 105 which are formed in a machine frame 107. The upper reach of the conveyor belt rests upon a raising and lowering platform 108 of a glass cutting or scoring apparatus 110 of the type disclosed in United States Patent No. 2,048,935, dated July 28, 1936.

When the apparatus 110 is inactive, the platform is in the lower position indicated in broken lines of Fig. 7, and in this relation, a sheet glass unit 100 can be positioned on the portion of the belt carried thereby. The apparatus frame carries an electric bulb 112 which is not energized until the operation of the apparatus is commenced. In initiating the operation of this cutting apparatus, a starting switch or button 113 is actuated to energize the apparatus in such manner as to raise the platform 108, as well as to lift the upper reach of the belt and the glass carried thereby, to such position that the upper glass surface is engaged by a cutting tool 114. The actuation of the button 113 also lights the bulb 112 to provide a signal indicating that all the mechanism is ready for operation. A horizontally movable sectional arm 115 which supports the cutting tool at its outer end has a pivotal support 117 connecting the sectional arm upon the apparatus, and an intermediate pivotal connection 118 provides for proper flexibility among the sectional portions of the arm.

An operator grasps a handle 120 of the arm and moves the cutting tool 114 in a path determined by a template 121 with which the sheet glass has been aligned and which is secured to the apparatus in a position above the conveyor belt by means of supporting bars 123. A substantially endless score or cut 124 is thus made in the upper surface of the glass.

At the completion of a substantially endless cut or scoring operation, the handle of the cutting arm strikes a limit switch 125 and, in response to this action, the platform 108 is released and drops to the position shown in broken lines of Fig. 7. As the platform reaches its lower position, it actuates a second limit switch 127 which has electrical connection with an electric motor 130 for energizing the latter and driving, by means of suitable sprocket and chain gearing 132, a second felt-covered conveyor belt 131 carried by drums 133 and 134 that are rotatable in bearing supports 135 in the frame 107. Driving power from the motor is transmitted through the drum 134 to the drum 104 by means of a sprocket chain 137 which is connected in driving relation with sprockets 138 carried by these drums. This chain is further trained about sprockets 136 carried by brush rolls 139 that are rotatably mounted in the frame 107. A suitable adjustable idler 140 is also rotatably carried by the frame for adjusting the chain and maintaining proper tension therein.

A pair of smaller rolls 141 having their upper surfaces substantially horizontally aligned with the upper surfaces of the drums 104 and 134 are rotatably supported in the frame 107 and are provided with sprockets 143 engaged by the chain 137 for driving them. The peripheral speed of these rolls 141 is substantially the same as the peripheral speed of the drums or the linear speed of the conveyor belts, and they aid in transferring a glass sheet from the belt 101 to the belt 131. However, the peripheral speed of the brush rolls 139 is greater for the purpose of frictionally brushing the surfaces of the belts along their lower reaches and removing whatever foreign matter that might be collected thereon. It will be noted that the adjacent surfaces of the belts and brush rolls move in opposed directions during operation thereof.

In response to the operation of the motor 130 and consequent travel of the conveyor belts, the sheet glass unit 100 is moved forwardly thereon from the position indicated at A to the position indicated at B. The distance from A to B corresponds to the circumference of the drum 103 and at the completion of one revolution of this drum, a tripping member 145 carried thereby actuates a switch 147 that breaks an electric connection with the motor and arrests the operation of the latter. This action provides for maintaining the belts stationary for a predetermined interval.

The actuation of the switch 147 in addition to arresting operation of the motor, completes an electric circuit to an electrically operated multiple valve 150 (Fig. 8) which communicates with a source of fluid under pressure, not shown, through a flexible conduit 151. Upon actuation of this switch, fluid under pressure is supplied through the valve 150 into the bottom portion of a cylinder 153 to actuate a piston 154. A piston rod 157 connected to the piston is thus actuated upwardly to the full line position shown in Fig. 8. The upper end of the piston rod has a pivotal connection 159 with an end portion of a cross beam 160 which is pivotally supported intermediate its ends, as indicated at 161, upon a press frame 163 over which the conveyor belt 131 passes.

Opposite ends of the beam 160 are provided with similar upright links 164 having lower end pivotal connections 165 therewith and also upper end pivotal connections 167 with the outer ends of arms 168 which constitute parts of bell cranks 170 disposed on the press frame on opposite sides of the conveyor belt 131. Bearing shafts 171 rotatably mounted in the press frame form parts of, and support, the bell cranks for movement about horizontal axes. Upwardly extending arms 173 of the bell cranks are provided with horizontally disposed locking bars 174 which engage the top of the press head 175 to hold it firmly upon the conveyor belt and against a bed plate 178 forming a part of the press frame. Vertical corner guides 179 slidably receive the corner portions of the press head (Fig. 6) to provide for free vertical movement thereof. The press head 175 is notched, as indicated at 177, to receive the arms 173 and to permit movement of the bars 174 over the marginal portions of the press head.

Lifting rollers 180 carried by inwardly disposed brackets 181 that are rigid at the upper bell crank arms 173 are engagable with the lower marginal sides of the press head to raise the latter when the piston rod 157 is actuated downwardly from the position shown in Fig. 8. Clamping devices 183 (Fig. 9) rigidly secure the marginal portions of the diaphragm 186 to the lower side of the press head by means of fasteners 184. This arrangement provides a fluid-tight pressure chamber 185 communicating through flexible conduits 187 with a suitable source of fluid under pressure, not shown. Likewise, flexible conduits 189 communicate with this chamber and with a source of sub-atmospheric pressure or vacuum. The diaphragm is composed of flexible or resilient material, such as rubberized fabric.

At substantially the end of the upward stroke of the piston rod 157, the end of the beam 160 remote therefrom and which has a tripper 190 formed thereon actuates a switch 191 of an electric timer 192 to open a valve 193 shown diagrammatically and to admit fluid under pressure during a timed interval into the chamber 185. Assuming that the machine had been operated through one cycle, or that a scored sheet glass unit 100 were placed at station B, the travel of the conveyor belt during the succeeding revolution of the drum 103 after actuating the switch 127 carries the glass unit to the bed plate 178 of the press to a position immediately beneath the diaphragm 186. The downward actuation of the press head brings the diaphragm into covering engagement with the glass unit over and beyond the edges thereof. The tripping of the switch 191 causes the valve 193 to admit fluid under pressure to the chamber 185 during a timed interval and the operation of trimming or snapping off the marginal portions of the glass is effected. This action requires only a few seconds. The valve 193 is automatically closed by the timer after admitting fluid at predetermined pressure, for example, 80 pounds per square inch. After the interval of admitting fluid under pressure, another valve 194 which places the chamber 185 in communication with sub-atmospheric pressure or vacuum through the conduits 189 is automatically opened by the timer to exhaust the fluid from the chamber and to prevent the diaphragm from sagging.

In connection with establishing communication between a source of sub-atmospheric pressure and the chamber 185, the timer actuates the multiple valve 150 in such manner as to admit fluid under pressure into the upper end of the cylinder 153 and thus to lower the piston rod 157. This operation pivots the arms 173 outwardly in opposite directions to release the bars 174 from the edges of the press head 175. The lifting rolls 180 then engage the bottom side of the head 175 and raise it to such extent that the diaphragm is withdrawn from contact with the glass unit.

In the downward movement of the piston rod 157 a switch tripper 195 at the end of the beam 169 opposite the tripper 190 actuates a switch 197 which places all of the switches in position for recurrence of the cycle of operation described. Then by placing another sheet glass unit upon the conveyor belt 101 beneath the template 121 and actuating the starting button 113, the cycle of operation can be repeated.

It is, of course, to be understood that the switch 113 can be so arranged in an electric circuit that after it has initiated the cycle of operation, such cycle can be automatically repeated without manually starting it at the completion of the operations described.

In an intermittent and automatic operation of the apparatus, the glass unit is successively moved on the conveyor system from the station A, where it is scored, to an open or intermediate station B, where it can be inspected. Thence the unit is conveyed to the press bed plate at station C, where pressure is applied for snapping the marginal glass portions, and then the glass is moved to station D, where the snapped off marginal portions are removed. The completely trimmed sheet glass can be removed and stacked as desired, or fed to another conveyor for further handling. The intervals between movement of the glass from one station to another are so calculated that substantially continuous operation is effected in trimming the glass.

The conveyor belts 101 and 131 are so designed as to be of different texture or degrees of yieldability desired for properly supporting the glass during the scoring and snapping operations. The felt coverings on the two belts can be applied accordingly.

Although only illustrative examples of the invention have been shown and described in detail, it will be apparent to those skilled in the art that the invention is not so limited but that various changes can be made therein without departing from the spirit of the invention or from the scope of the appended claims.

We claim:

1. A method of trimming sheet glass which comprises scoring the sheet glass surface along a predetermined path, supporting the sheet glass against a flat surface of such texture as to permit the glass to snap along its scored path, and applying sufficient pressure pneumatically over the area of the sheet glass to snap the glass along its scored path.

2. A method of trimming sheet glass which comprises scoring the sheet glass surface along a predetermined line, supporting the sheet glass against a flat surface, covering the sheet glass with a flexible diaphragm, and applying fluid under pressure uniformly over the area of the diaphragm covering the sheet glass and in sufficient degree to snap the latter along the scoring line.

3. A method of trimming sheet glass which comprises scoring the sheet glass adjacent its border, supporting the sheet glass against a substantially flat surface sufficiently yieldable to permit the glass to snap along its scored portion, covering the sheet glass with a flexible sheet, and applying fluid under pressure substantially uniformly over the area of the flexible sheet covering the sheet glass and in sufficient degree to snap said glass along its scored portion.

4. A method of trimming a sheet glass unit which comprises scoring the glass unit along a substantially endless line adjacent the edges of the glass unit, confining the glass unit between a pair of cushioning members which envelop the glass unit and meet beyond the edges of the latter, applying fluid under pressure against one of the cushioning members while holding the other cushioning member against displacement to press the glass unit between said members to such extent as to snap the glass along the scoring line.

5. A method of trimming a sheet glass unit which comprises scoring the glass unit adjacent an edge portion thereof, confining the glass unit between a pair of flexible cushioning sheets which envelop the glass unit and meet beyond the edges of the latter, applying fluid under pressure uniformly over the area of one of the cushioning sheets while holding the other cushioning sheet against displacement to snap the glass unit along the scored portion.

6. A method of trimming a sheet glass unit which comprises scoring the sheet glass unit along a substantially endless line adjacent the edge portions thereof, pneumatically applying pressure to said unit against one side thereof while yieldably supporting the opposite side and in such manner as to accentuate the pressure along the marginal portions of the sheet glass unit sufficiently to snap the glass unit along its scored portion.

7. A method of trimming a sheet glass unit which comprises scoring the sheet glass unit along a line adjacent the border thereof, tensioning a sheet under pressure upon one side of the sheet glass unit while supporting the other side of said unit uniformly over its area, the tensioning action including the drawing of the tensioned sheet in a direction inclined outwardly from the glass edge and toward the plane of said other side of the sheet glass unit to impart forces uniformly tending to tilt outwardly the edge of the glass adjacent the scored line, and of sufficient intensity to snap the glass along the scoring line.

8. A method of trimming a sheet glass unit which comprises coextensively scoring opposite sides of the sheet glass unit adjacent its border, supporting the sheet glass unit against a flat surface, covering the sheet glass unit with a flexible sheet, applying fluid under pressure over the area of the flexible sheet covering the unit and at sufficient pressure to snap the unit along its scored portion, releasing the unit, then turning over the glass unit and repeating the above specified steps on the opposite side thereof.

9. A method of trimming a sheet glass unit which comprises coextensively scoring opposite sides of said unit adjacent its border, fitting the sheet glass unit against a sheet pattern corresponding in shape to the shape of the scored pattern with the edges of the said pattern registering with the scoring, supporting the combined sheet glass unit and sheet pattern against a flat surface, covering the sheet glass unit with a flexible sheet, applying fluid under pressure over the area of the flexible sheet covering said unit and at sufficient pressure to snap the glass unit along its scored portion, relieving the pressure and removing the sheet pattern, then turning over the sheet glass unit and reapplying fluid under pressure in the same manner as that specified above.

WALKER H. CRAIG.
GEORGE I. FINLEY, Jr.